(12) United States Patent
Uhm et al.

(10) Patent No.: US 9,991,507 B2
(45) Date of Patent: Jun. 5, 2018

(54) ELECTRODE FOR SECONDARY BATTERY HAVING IMPROVED ENERGY DENSITY AND LITHIUM SECONDARY BATTERY INCLUDING THE SAME

(71) Applicant: LG Chem, Ltd., Seoul (KR)

(72) Inventors: In Sung Uhm, Daejeon (KR); Je Young Kim, Daejeon (KR); Ji Yoon Kwon, Daejeon (KR)

(73) Assignee: LG Chem, Ltd. (KR)

( * ) Notice: Subject to any disclaimer, the term of this patent is extended or adjusted under 35 U.S.C. 154(b) by 50 days.

(21) Appl. No.: 14/787,154

(22) PCT Filed: Jul. 25, 2014

(86) PCT No.: PCT/KR2014/006814
§ 371 (c)(1),
(2) Date: Oct. 26, 2015

(87) PCT Pub. No.: WO2015/012640
PCT Pub. Date: Jan. 29, 2015

(65) Prior Publication Data
US 2016/0133922 A1    May 12, 2016

(30) Foreign Application Priority Data
Jul. 26, 2013  (KR) ........................ 10-2013-0088634

(51) Int. Cl.
| | |
|---|---|
| *H01M 4/36* | (2006.01) |
| *H01M 4/131* | (2010.01) |
| *H01M 4/505* | (2010.01) |
| *H01M 10/052* | (2010.01) |
| *H01M 4/62* | (2006.01) |
| *H01M 4/1391* | (2010.01) |
| *H01M 10/0525* | (2010.01) |
| *H01M 4/02* | (2006.01) |

(52) U.S. Cl.
CPC ........... *H01M 4/364* (2013.01); *H01M 4/131* (2013.01); *H01M 4/1391* (2013.01); *H01M 4/505* (2013.01); *H01M 4/625* (2013.01); *H01M 10/052* (2013.01); *H01M 10/0525* (2013.01); *H01M 2004/021* (2013.01); *H01M 2004/028* (2013.01)

(58) Field of Classification Search
CPC .... H01M 4/364; H01M 4/131; H01M 4/1391; H01M 4/505; H01M 4/625; H01M 10/052; H01M 10/0525; H01M 2004/021; H01M 2004/028
See application file for complete search history.

(56) References Cited

U.S. PATENT DOCUMENTS

| | | | |
|---|---|---|---|
| 5,527,643 A * | 6/1996 | Sonobe ................. | H01M 4/583 252/502 |
| 6,300,008 B1 | 10/2001 | Iijima et al. | |
| 2001/0031391 A1* | 10/2001 | Hironaka ............... | H01M 2/06 429/94 |
| 2002/0197201 A1* | 12/2002 | Fukuda .................. | C01B 31/04 423/448 |
| 2004/0013942 A1* | 1/2004 | Fukumoto ............... | H01B 1/04 429/231.8 |
| 2005/0069773 A1* | 3/2005 | Nakai ............... | H01M 10/0525 429/231.1 |
| 2005/0170251 A1 | 8/2005 | Jung et al. | |
| 2006/0115732 A1* | 6/2006 | Zaghib ................. | H01M 4/131 429/231.1 |
| 2007/0071669 A1* | 3/2007 | Guerfi .................... | C01B 31/04 423/448 |
| 2007/0298322 A1 | 12/2007 | Yamamoto et al. | |
| 2008/0038635 A1 | 2/2008 | Sheem et al. | |
| 2008/0274406 A1 | 11/2008 | Fuse et al. | |
| 2009/0258298 A1 | 10/2009 | Umeno et al. | |
| 2010/0308278 A1* | 12/2010 | Kepler .................. | H01M 4/139 252/506 |
| 2011/0217585 A1* | 9/2011 | Wang ...................... | B32B 37/02 429/145 |
| 2011/0311869 A1 | 12/2011 | Oh et al. | |
| 2012/0217435 A1 | 8/2012 | Yamamoto et al. | |
| 2013/0189578 A1 | 7/2013 | Oh et al. | |

FOREIGN PATENT DOCUMENTS

| | | | | |
|---|---|---|---|---|
| JP | 02087466 A | * | 3/1990 | ............. H01M 4/02 |
| JP | 03001443 A | * | 1/1991 | |
| JP | 08007894 A | * | 1/1996 | |
| JP | H0927344 A | | 1/1997 | |
| JP | 10188955 A | * | 7/1998 | |
| JP | H10233205 A | | 9/1998 | |
| JP | H10330107 A | | 12/1998 | |
| JP | H1145707 A | | 2/1999 | |
| JP | H11283628 A | | 10/1999 | |
| JP | 11345607 A | * | 12/1999 | |
| JP | 2000331682 A | * | 11/2000 | ............. H01M 4/505 |
| JP | 2001213615 A | * | 8/2001 | |

(Continued)

OTHER PUBLICATIONS

J-PlatPat Machine Translation of JP 2005-158623A (Jun. 2005).*
J-PlatPat Machine Translation of JP 2002-270180 (Sep. 2002).*
K-PION Machine Translation of KR 1020020079280A (Year: 2002).*
International Search Report for Application No. PCT/KR2014/006814 dated Nov. 3, 2014.

*Primary Examiner* — Gregg Cantelmo
(74) *Attorney, Agent, or Firm* — Lerner, David, Littenberg, Krumholz & Mentlik, LLP

(57) ABSTRACT

Disclosed are an electrode for a secondary battery having improved energy density and a lithium secondary battery including the same. More particularly, an electrode for a secondary battery, in which an electrode mix including an electrode active material, and a material having a shape easily rolled during electrode rolling as a conductive material is coated on an electrode current collector, and a lithium secondary battery including the same are provided.

17 Claims, No Drawings

(56) References Cited

FOREIGN PATENT DOCUMENTS

| | | | |
|---|---|---|---|
| JP | 2002270180 A | * | 9/2002 |
| JP | 2002343362 A | | 11/2002 |
| JP | 2005158623 A | * | 6/2005 |
| JP | 2005158737 A | | 6/2005 |
| JP | 2007294415 A | | 11/2007 |
| JP | 2011096650 A | | 5/2011 |
| JP | 2012146590 A | | 8/2012 |
| KR | 10-1998-0026161 A | | 7/1998 |
| KR | 10-2001-0097422 A | | 11/2001 |
| KR | 20020079280 A | * | 10/2002 |
| KR | 10-2005-0099697 A | | 10/2005 |
| KR | 10-0666869 B1 | | 1/2007 |
| KR | 20070026786 A | | 3/2007 |
| KR | 10-2007-0056765 | | 6/2007 |
| KR | 10-2008-0075492 A | | 8/2008 |
| KR | 20110097719 A | | 8/2011 |
| WO | 2012039563 A2 | | 3/2012 |

\* cited by examiner

ELECTRODE FOR SECONDARY BATTERY HAVING IMPROVED ENERGY DENSITY AND LITHIUM SECONDARY BATTERY INCLUDING THE SAME

CROSS-REFERENCE TO RELATED APPLICATION

The present application is a national phase entry under 35 U.S.C. § 371 of International Application No. PCT/KR2014/006814, filed Jul. 25, 2014, which claims priority from KR10-2013-0088634, filed Jul. 26, 2013, all of which are incorporated herein by reference.

TECHNICAL FIELD

The present invention relates to an electrode for a secondary battery having improved energy density and a lithium secondary battery including the same.

BACKGROUND ART

As mobile device technology continues to develop and demand therefor continues to increase, demand for secondary batteries as energy sources is rapidly increasing. Among these secondary batteries, lithium secondary batteries which exhibit high energy density and voltage, long lifespan and low self-discharge ratio are commercially available and widely used.

As positive electrode active materials for such lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure and the like, and lithium-containing nickel oxides such as $LiNiO_2$ is also under consideration.

$LiCoO_2$ is widely used due to excellent overall physical properties such as excellent cycle properties, and the like, but is low in safety. In addition, due to resource limitations of cobalt as a raw material, $LiCoO_2$ is expensive and massive use thereof as power sources in fields such as electric vehicles and the like is limited. Due to characteristics of preparation methods of $LiNiO_2$, it is difficult to apply $LiNiO_2$ to mass production processes at reasonable cost.

On the other hand, lithium manganese oxides, such as $LiMnO_2$, $LiMn_2O_4$, and the like, are advantageous in that they contain Mn, which is an abundant and environmentally friendly raw material, and thus are drawing much attention as a positive electrode active material that can replace $LiCoO_2$. However, such lithium manganese oxides also have disadvantages such as poor cycle characteristics and the like.

First, $LiMnO_2$ has disadvantages such as a small initial capacity and the like. In particular, $LiMnO_2$ requires dozens of charge and discharge cycles until a constant capacity is reached. In addition, capacity reduction of $LiMn_2O_4$ becomes serious with increasing number of cycles, and, at particularly high temperature of 50° C. or more, cycle characteristics are rapidly deteriorated due to decomposition of an electrolyte solution, elution of manganese and the like.

Meanwhile, as lithium-containing manganese oxides, there is $Li_2MnO_3$ in addition to $LiMnO_2$ and $LiMn_2O_4$. Since structural stability of $Li_2MnO_3$ is excellent but it is electrochemically inactive, $Li_2MnO_3$ itself cannot be used as a positive electrode active material of secondary batteries. Therefore, some prior technologies suggest a technology of using a solid solution of $Li_2MnO_3$ and $LiMO_2$ (M=Co, Ni, $Ni_{0.5}Mn_{0.5}$, Mn) as a positive electrode active material. In such a positive electrode active material solid solution, Li and O are departed from a crystal structure at a high voltage of 4.5 V and, thus, electrochemical activity is exhibited. However, there are problems such as high possibility of electrolyte solution decomposition and gas generation at high voltage, and massive use of relatively expensive materials such as $LiMO_2$ (M=Co, Ni, $Ni_{0.5}Mn_{0.5}$, Mn) and the like.

In addition, in active materials using secondary particles prepared by firing precursors the lithium-containing manganese oxide and the like, cracks are easily generated during electrode processes and, after crack generation, lifespan degradation is exhibited due to collapse of inner particles. Accordingly, it is difficult to guarantee desired stability and limited to anticipate improvement of energy density.

Therefore, there is an urgent need for technology to resolve such problems.

DISCLOSURE

Technical Problem

Therefore, the present invention has been made to solve the above problems and other technical problems that have yet to be resolved.

As a result of a variety of extensive and intensive studies and experiments, the inventors of the present invention confirmed that desired effects may be accomplished when an electrode mix includes an electrode active material and a material having an shape easily rolled during electrode rolling as a conductive material, as described below, thus completing the present invention.

Technical Solution

In accordance with one aspect of the present invention, provided is an electrode for a secondary battery including an electrode mix, which includes an electrode active material, and a material having a shape easily rolled during electrode rolling as a conductive material, coated on an electrode current collector.

In one specific embodiment, the material having a shape easily rolled during electrode rolling may be natural graphite and/or artificial graphite thermally treated at 2800° C. or more. Such graphite based materials may perform buffer action preventing particle collapse of the electrode active material in a press process of the electrode.

The inventors of the present application confirmed that carbon black based conductive materials used as a conventional conductive material is obtained by thermally treating at 800 to 1500° C. and thus has low surface hardness, but, since the natural graphite, or artificial graphite thermally treated at 2800° C. or more has a soft shape like semiconductor and thus has relatively low surface hardness and predetermined elasticity, the natural graphite or the artificial graphite performs buffer action when the natural graphite or the artificial graphite, with the electrode active material, is added to the electrode mix, and thus, when pressed, particle collapse of the electrode active material may be effectively prevented.

As particular properties of the material having a shape easily rolled during electrode rolling, an average particle diameter thereof may be 3 micrometers to 20 micrometers, a specific surface area thereof may be 5.0 $m^2/g$ to 8.0 $m^2/g$, a tap density thereof may be 0.85 g/ml to 1.20 g/ml, a true density thereof may be 2.20 g/cc to 2.30 g/cc, particularly, 2.20 g/cc to 2.24 g/cc. In addition, a spheroidization degree thereof may be 10 to 100.

The spheroidization degree may be drawn, according to a formula below, by measuring intensity of (110) and (004) planes of the graphite material using X-ray diffractometer.

Spheroidization degree={intensity of (110) plane/
intensity of (004) plane}×100

When the true density among the values is outside the range, surface hardness is great, whereby buffer effects during rolling according to the present invention may not be obtained.

In one specific embodiment, a shape of the material having a shape easily rolled during electrode rolling is not limited and may be a scale shape, a spherical-like shape, an oval shape, a fiber shape, a spindle shape or an onion shape, particularly a scale shape or an oval shape.

Meanwhile, in a specific embodiment, the material, which has a shape easily rolled during electrode rolling as a conductive material, included in the electrode mix with the electrode active material, as described above may be uniformly dispersed in the whole of an electrode mix and, to more effectively perform buffer action, may be intensively dispersed on a surface of the electrode active material in a surface-wrapping form.

In one specific embodiment, to effectively perform buffer action, the material having a shape easily rolled during electrode rolling may be included in an amount of 0.1 wt % to 5 wt % based on the total weight of the electrode mix.

Outside the range, when the material is included in an amount of less than 0.1 wt %, desired buffer action effects may not be accomplished. When the material is included in an amount of greater than 5 wt %, the amount of the electrode active material is relatively decreased and, thus, energy density is undesirably decreased.

Meanwhile, the electrode active material may include a lithium transition metal oxide represented by Formula 1 or 2 below.

$$Li_xM_yMn_{2-y}O_{4-z}A_z \quad (1)$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $$0.9 \leq x \leq 1.2, \; 0 < y < 2, \text{ and } 0 \leq z < 0.2.$$

$$(1-x)LiM'O_{2-y}A_y\text{-}xLi_2MnO_{3-y'}A_{y'} \quad (2)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $$0 < x < 1, \; 0 < y \leq 0.02, \; 0 < y' \leq 0.02, \; 0.5 \leq a \leq 1.0, \; 0 \leq b \leq 0.5, \text{ and } a+b=1.$$

The electrode active material may include first particles having an average particle diameter (D50) of 10 nanometers to 50 nanometers and/or secondary particles, in which the first particles are agglomerated, having average particle diameters (D50) of 3 micrometers to 15 micrometers.

When the electrode active material is composed of secondary particles as described above, particles of the electrode active material may be more easily collapsed during electrode pressing, whereby particle collapse of the electrode active material may be more effectively prevented through application of the present invention.

In one specific embodiment, the electrode mix layer according to the present invention including the electrode active material and the material having a shape easily rolled during electrode roll may be pressed under greater pressure due to buffer action of the material having a shape easily rolled during electrode rolling. Therefore, a porosity of the electrode mix layer may be 17% to 32%.

In one specific embodiment, the electrode may be a positive electrode.

In general, the positive electrode is prepared by drying after coating a mixture of a positive electrode active material, a conductive material and a binder, as an electrode mix, on a positive electrode current collector. In this case, as desired, the mixture may further include a filler.

Examples of the positive electrode active material may include, in addition to the lithium transition metal oxide represented by Formula 1 or 2, layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

As the conductive material, a material having a shape easily rolled during electrode rolling may be only used. Alternatively, there is no particular limit as to the conductive material, so long as it does not cause chemical changes in the fabricated battery and has conductivity. For example, graphite such as natural or artificial graphite which is not thermally treated; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used with the material.

When the material having a shape easily rolled and the materials are used together during electrode rolling according to the present invention, a conductive material may be generally included in an amount of 1 to 50 wt % based on a total weight of a mixture including a positive electrode active material.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The present invention also provides a secondary battery including the electrode, and the secondary battery may be a lithium ion battery, a lithium ion polymer battery, or a lithium polymer battery.

In general, the lithium secondary batteries include a positive electrode, a negative electrode, a separator disposed between the positive electrode and the negative electrode, and a lithium salt-containing non-aqueous electrolyte. The other components of the lithium secondary batteries will be described below.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0<x\leq 1$; $1\leq y\leq 3$; and $1\leq z\leq 8$; lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$ The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

The present invention provides a battery module including the secondary battery as a unit cell, a battery pack including the battery module and a device including the battery pack as a power source.

In this regard, particular examples of the device include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

MODE FOR INVENTION

Now, the present invention will be described in more detail with reference to the accompanying drawings. These examples are provided for illustrative purposes only and should not be construed as limiting the scope and spirit of the present invention.

Example 1

90 wt % of $LiMn_{1.5}N_{0.5}iO_2$ as a positive electrode active material, 5.0 wt % of natural graphite as a conductive material and 5.0 wt % of PVdF as a binder were added to NMP as a solvent and mixed, thereby preparing a positive electrode mix. The prepared positive electrode mix was coated in a thickness of 200 μM on aluminum foil having a thickness of 20 μm and then rolling and drying were performed, thereby manufacturing a positive electrode. Here, the natural graphite had an average particle diameter of 16 micrometers, a specific surface area of 6.8 m²/g, a tap density of 1.04 g/ml, a true density of 2.23 g/cc and a spheroidization degree of 60.

95 wt % of artificial graphite as a negative electrode active material, 1.5 wt % of Super-P as a conductive material and 3.5 wt % of PVdF as a binder were added to NMP as a solvent and mixed, thereby preparing a negative electrode mix. The prepared negative electrode mix was coated in a thickness of 200 μm on copper foil having a thickness of 20 μm and then rolling and drying were performed, thereby manufacturing a negative electrode.

A porous polyethylene separator was disposed between the positive electrode and the negative electrode and an electrolyte solution, in which 1 M $LiPF_6$ was dissolved in a carbonate solvent including EC and EMC mixed in a ratio of 1 to 2, was injected, thereby manufacturing a battery.

Example 2

A positive electrode, a negative electrode and a battery were manufactured in the same manner as in Example 1, except that 0.5 wt % of natural graphite as a conductive material, 4.5 wt % of Denka black and 5.0 wt % of PVdF as a binder were used.

Example 3

A positive electrode, a negative electrode and a battery were manufactured in the same manner as in Example 1, except that 5.0 wt % of artificial graphite thermally treated at 3000° C. as a conductive material and 3.5 wt % of PVdF as a binder were used. Here, the artificial graphite thermally treated at 3000° C. had an average particle diameter of 16 micrometers, a specific surface area of 7.2 m²/g, a tap density of 1.1 g/ml, a true density of 2.21 g/cc and a spheroidization degree of 40.

Example 4

A positive electrode, a negative electrode and a battery were manufactured in the same manner as in Example 1, except that 2.5 wt % of artificial graphite thermally treated at 3000° C. as a conductive material, 2.5 wt % of Denka black and 5.0 wt % of PVdF as a binder were used.

Comparative Example 1

A positive electrode, a negative electrode and a battery were manufactured in the same manner as in Example 1, except that 5.0 wt % of Denka black was used as a conductive material of a positive electrode active material.

Comparative Example 2 a positive electrode, a negative electrode and a battery were manufactured in the same manner as in Example 1, except that 5.0 wt % of Super-P was used as a conductive material of a positive electrode active material.

Comparative Example 3

A positive electrode, a negative electrode and a battery were manufactured in the same manner as in Example 1, except that 2.5 wt % of natural graphite, which was coated with pitch and thermally treated at 1200° C., as a conductive material of a positive electrode active material and 2.5 wt % of Denka black were used. Here, the natural graphite coated with pitch has an average particle diameter of 16 micrometers, a specific surface area of 2.8 m²/g, a tap density of 1.01 g/ml, a true density of 2.18 g/cc and a spheroidization degree of 65.

Experimental Example 1

Battery Test

For the lithium secondary batteries manufactured according to Examples 1 to 4 and Comparative Examples 1 to 3, experiments to evaluate battery capacities, rate characteristics and cycle characteristics were carried out. Results are summarized in Table 1 below.

|  | Battery characteristics | | |
| --- | --- | --- | --- |
|  | Capacity (mAh) | Rate (1 C/0.2 C) | Cycle characteristics (%, capacity maintenance ratio at a 300th cycle) |
| Example 1 | 820 | 95% | 93% |
| Example 2 | 818 | 91% | 88% |
| Example 3 | 815 | 92% | 91% |
| Example 4 | 819 | 94% | 92% |
| Comparative Example 1 | 810 | 88% | 86% |
| Comparative Example 2 | 812 | 89% | 88% |
| Comparative Example 3 | 805 | 81% | 83% |

As shown in Table 1, it can be confirmed that the batteries according to Examples 1 to 4 of the present invention exhibit improved battery capacity, rate characteristics and cycle characteristics, when compared with the batteries according to Comparative Examples 1 to 3. This is since the batteries includes the material performing buffer action during electrode pressing as a conductive material, and thus, side reactivity by preventing particle collapse of the electrode active material during pressing is decreased and lifespan characteristics thereof are improved by preventing inner particle collapse. In addition, since pressing is possible under higher pressure by preventing particle collapse, porosity may be decreased, and thus, energy density may be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an electrode for a secondary battery according to the present invention includes the material having a shape easily rolled during electrode rolling as a conductive material, and thus, the material having a shape easily rolled during electrode rolling performs buffer action in an electrode mix. Accordingly, by preventing particle collapse of an electrode active material during pressing and, at the same time, by decreasing porosity, lifespan characteristics and energy density per volume may be improved.

The invention claimed is:

1. A positive electrode for a secondary battery, comprising:
an electrode layer having a positive electrode active material and a first conductive material; and
a positive electrode current collector,
wherein the first conductive material is one of natural graphite, artificial graphite thermally treated at 2800° C. or more, or a combination thereof, and present in an amount ranging from 0.1 wt % to 5 wt % based on a total weight of the electrode layer, and
wherein the first conductive material has an average particle diameter ranging from 3 micrometers to 20 micrometers,
wherein a specific surface area of the first conductive material is 5.0 m²/g to 8.0 m²/g,
wherein a tap density of the first conductive material is 0.8 g/ml to 1.2 g/ml,
wherein a true density of the first conductive material is 2.20 g/cc to 2.30 g/cc, and
wherein a spheroidization degree of the first conductive material is 10 to 100.

2. The positive electrode according to claim 1, wherein the electrode active material comprises particles of positive electrode active material.

3. The positive electrode according to claim 1, wherein the first conductive material is uniformly distributed in the electrode layer.

4. The positive electrode according to claim 1, wherein the first conductive material is present on a surface of the electrode active material.

5. The positive electrode according to claim 1, wherein the first conductive material has a scale shape, a spherical shape, an oval shape, a fiber shape, a spindle shape or an onion shape.

6. The positive electrode according to claim 1, wherein the electrode active material comprises a lithium transition metal oxide represented by Formula 1 or 2 below:

$$Li_xM_yMn_{2-y}O_{4-z}A_z \qquad (1)$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;
A is at least one monovalent or divalent anion; and $$0.9 \leq x \leq 1.2, \ 0 < y < 2, \text{ and } 0 \leq z < 0.2,$$

$$(1-x)LiM'O_{2-y}A_y-xLi_2MnO_{3-y'}A_{y'} \qquad (2)$$

wherein M' is $Mn_aM_b$;
M is at least one selected from the group consisting of Ni, Ti, Co, Al, Cu, Fe, Mg, B, Cr, Zr, Zn and Period II transition metals;
A is at least one selected from the group consisting of anions such as $PO_4$, $BO_3$, $CO_3$, F and $NO_3$; and $$0<x<1, \ 0<y\leq 0.02, \ 0<y'\leq 0.02, \ 0.5 \leq a \leq 1.0, \ 0 \leq b \leq 0.5,$$
$$\text{and } a+b=1.$$

7. The positive electrode according to claim 1, wherein the electrode active material comprises first particles having average particle diameters (D50) of 10 nanometers to 50 nanometers and/or secondary particles, in which the first particles are agglomerated, having average particle diameters (D50) of 3 micrometers to 15 micrometers.

8. The positive electrode according to claim 1, wherein a porosity of the electrode layer is 17% to 32%.

9. A secondary battery comprising the electrode according to claim 1.

10. The secondary battery according to claim 9, wherein the secondary battery is a lithium ion battery, a lithium ion polymer battery, or a lithium polymer battery.

11. A battery module comprising the secondary battery according to claim 9 as a unit cell.

12. A battery pack comprising the battery module according to claim 11.

13. A device comprising the battery pack according to claim 12 as a power source.

14. The device according to claim 13, wherein the device is an electric vehicle, a hybrid electric vehicle, a plug-in hybrid electric vehicle, or a system for power storage.

15. The positive electrode according to claim 1, wherein the first conductive material is present in an amount ranging from 0.5 wt % to 5 wt % based on a total weight of the electrode layer.

16. The positive electrode according to claim 1, wherein the electrode layer further comprises a second conductive material different from the first conductive material.

17. The positive electrode according to claim 16, wherein the second conductive material is selected from the group consisting of natural graphite that is not thermally treated, artificial graphite that is not thermally treated; carbon black, acetylene black, Ketjen black, channel black, furnace black, lamp black, thermal black, and mixtures thereof.

* * * * *